United States Patent
Kraus et al.

(10) Patent No.: US 9,441,403 B2
(45) Date of Patent: Sep. 13, 2016

(54) POWER LOCKING DOOR HANDLES WITH INTEGRATED KEYPAD

(71) Applicant: TRIMARK CORPORATION, New Hampton, IA (US)

(72) Inventors: Jason Kraus, Nashua, IA (US); Anita L. Reichling, New Hampton, IA (US); Eric Wickstrom, Charles City, IA (US); David S. Magner, Decorah, IA (US)

(73) Assignee: TRIMARK CORPORATION, New Hampton, IA (US)

( * ) Notice: Subject to any disclaimer, the term of this patent is extended or adjusted under 35 U.S.C. 154(b) by 0 days.

(21) Appl. No.: 14/276,529

(22) Filed: May 13, 2014

(65) Prior Publication Data

US 2014/0338409 A1    Nov. 20, 2014

Related U.S. Application Data

(60) Provisional application No. 61/823,640, filed on May 15, 2013.

(51) Int. Cl.
| | |
|---|---|
| *E05B 49/00* | (2006.01) |
| *E05B 85/16* | (2014.01) |
| *E05B 81/76* | (2014.01) |
| *E05B 47/00* | (2006.01) |

(52) U.S. Cl.
CPC .............. *E05B 85/16* (2013.01); *E05B 81/76* (2013.01); *E05B 47/0012* (2013.01); *E05B 49/00* (2013.01); *Y10T 70/70* (2015.04); *Y10T 70/7068* (2015.04); *Y10T 70/7486* (2015.04)

(58) Field of Classification Search
CPC ................... E05B 47/0012; E05B 2047/0058; E05B 49/00; E05B 2047/002; E05B 85/16; E05B 81/76; Y10T 70/70; Y10T 70/7068; Y10T 70/7486
USPC ......... 70/207–210, 213, 214, 224, 256, 257, 70/278.1, 279.1, DIG. 37; 340/5.54, 5.72; 362/501
See application file for complete search history.

(56) References Cited

U.S. PATENT DOCUMENTS

| | | | | |
|---|---|---|---|---|
| 1,833,572 | A * | 11/1931 | Hardesty | 70/262 |
| 2,317,700 | A * | 4/1943 | Thompson | 292/254 |
| 3,096,114 | A * | 7/1963 | Trammell, Jr. | 292/336.3 |
| 4,030,322 | A * | 6/1977 | Pettit | 70/159 |
| 4,093,289 | A * | 6/1978 | Inabayashi et al. | 292/336.3 |
| 4,494,326 | A * | 1/1985 | Kanamori | 40/593 |
| 4,965,950 | A * | 10/1990 | Yamada | 40/546 |
| 5,058,258 | A * | 10/1991 | Harvey | 29/401.1 |
| 5,265,452 | A * | 11/1993 | Dawson et al. | 70/278.3 |
| 6,116,066 | A * | 9/2000 | Gartner et al. | 70/278.1 |
| 6,240,751 | B1 * | 6/2001 | Marzolf et al. | 70/207 |

(Continued)

*Primary Examiner* — Suzanne Barrett
*Assistant Examiner* — Morgan McClure
(74) *Attorney, Agent, or Firm* — McKee, Voorhees & Sease, PLC

(57) ABSTRACT

A power locking pull or push button handle assembly is provided for a vehicle door having a lock and a latch. The handle assembly includes a base with a housing. A handle is pivotally mounted on the base, a power lock assembly is mounted within the housing on the base, and a keypad on the handle is operatively connected to the power lock assembly for keyless unlocking of the door. The handle includes a cover and backbone secured together, with the keypad sandwiched between the cover and backbone. The keypad is reinforced with a steel plate. Loads on the handle are shared by the backbone, cover, and keypad.

24 Claims, 16 Drawing Sheets

(56) References Cited

U.S. PATENT DOCUMENTS

| | | | |
|---|---|---|---|
| 6,523,377 B1 * | 2/2003 | Vonlanthen | 70/278.3 |
| 6,617,975 B1 | 9/2003 | Burgess | |
| 6,668,602 B2 * | 12/2003 | Graham et al. | 70/208 |
| 6,794,572 B1 * | 9/2004 | Chiang | 174/50 |
| 6,840,552 B2 * | 1/2005 | Ramsauer | 292/336.3 |
| 6,854,870 B2 * | 2/2005 | Huizenga | 362/501 |
| D506,377 S | 6/2005 | Marzolf et al. | |
| 7,040,125 B2 * | 5/2006 | Ciezki et al. | 70/208 |
| 7,086,258 B2 * | 8/2006 | Fisher et al. | 70/278.7 |
| 7,089,770 B2 * | 8/2006 | Ramsauer et al. | 70/208 |
| 7,152,441 B2 * | 12/2006 | Friar et al. | 70/78 |
| 7,194,881 B2 | 3/2007 | Kutschat | |
| 7,227,453 B2 | 6/2007 | Arunkumar | |
| 7,309,087 B2 * | 12/2007 | Lane et al. | 292/216 |
| 7,400,232 B2 * | 7/2008 | Reichling et al. | 340/426.36 |
| 7,576,631 B1 * | 8/2009 | Bingle et al. | 340/5.54 |
| 7,819,440 B2 | 10/2010 | Schwickerath | |
| D629,275 S | 12/2010 | Schmidt | |
| 7,911,321 B2 * | 3/2011 | Bingle et al. | 340/5.54 |
| 8,079,240 B2 * | 12/2011 | Brown et al. | 70/277 |
| 8,350,669 B2 | 1/2013 | Magner et al. | |
| 8,400,265 B2 | 3/2013 | Sarioglu et al. | |
| 8,579,481 B2 | 11/2013 | Minter et al. | |
| 8,640,514 B2 * | 2/2014 | Goren et al. | 70/280 |
| 8,850,858 B2 * | 10/2014 | Nave | 70/279.1 |
| 2002/0152778 A1 * | 10/2002 | Segawa | 70/208 |
| 2003/0031025 A1 * | 2/2003 | Huizenga | 362/501 |
| 2003/0216817 A1 * | 11/2003 | Pudney | 700/17 |
| 2004/0053648 A1 * | 3/2004 | Gremo et al. | 455/575.1 |
| 2004/0099026 A1 * | 5/2004 | Nunez | 70/283 |
| 2004/0208012 A1 * | 10/2004 | Wang | 362/487 |
| 2005/0190040 A1 * | 9/2005 | Huntzicker et al. | 340/5.54 |
| 2005/0279144 A1 * | 12/2005 | Kutschat | 70/210 |
| 2006/0065027 A1 * | 3/2006 | Valentine | 70/278.1 |
| 2006/0262549 A1 * | 11/2006 | Schmidt et al. | 362/459 |
| 2007/0240463 A1 * | 10/2007 | Antonucci | 70/208 |
| 2008/0178646 A1 * | 7/2008 | Schwickerath | 70/210 |
| 2009/0241615 A1 * | 10/2009 | Hansknecht | 70/224 |
| 2010/0007463 A1 * | 1/2010 | Dingman et al. | 340/5.72 |
| 2010/0219935 A1 * | 9/2010 | Bingle et al. | 340/5.54 |
| 2011/0148575 A1 * | 6/2011 | Sobecki et al. | 340/5.64 |
| 2011/0309912 A1 * | 12/2011 | Muller | 340/5.72 |
| 2012/0020045 A1 * | 1/2012 | Tanase | 361/807 |
| 2012/0055213 A1 * | 3/2012 | Sorensen et al. | 70/279.1 |
| 2012/0086314 A1 * | 4/2012 | Bourke et al. | 312/109 |
| 2012/0252364 A1 * | 10/2012 | Inabathuni et al. | 455/41.2 |
| 2012/0299700 A1 * | 11/2012 | Davis et al. | 340/5.54 |
| 2013/0233689 A1 * | 9/2013 | Ng | 200/5 A |
| 2013/0306450 A1 * | 11/2013 | Wolfe et al. | 200/304 |
| 2014/0347163 A1 * | 11/2014 | Banter et al. | 340/5.72 |
| 2015/0049024 A1 * | 2/2015 | Chen | 345/169 |
| 2015/0111622 A1 * | 4/2015 | Kee et al. | 455/575.1 |

\* cited by examiner

POWER LOCKING DOOR HANDLES WITH INTEGRATED KEYPAD

CROSS REFERENCE TO RELATED APPLICATIONS

This application claims priority under 35 U.S.C. §119 to provisional application U.S. Ser. No. 61/823,640 filed May 15, 2013, herein incorporated by reference in its entirety.

BACKGROUND OF THE INVENTION

Various types of handles are well-known for use on doors of agricultural and construction machinery, equipment, heavy trucks and other vehicles. For example, pull handles and push button handles have mechanical structures for unlatching a latched door. Power lock handles are also known, wherein a motor is housed within the handle, with a switch to activate the motor to control locking and unlocking of the door lock. One example of a power lock pull-type door handle is Applicant's issued Pat. No. 7,819,440.

An example of a push button-type door handle, without a power lock, is Applicant's Pat. No. 6,240,751. As shown in these patents, lock cylinders are also provided in the handles, with a key to lock and unlock the door.

Keyless door locks are also well-known, particularly in the automotive industry. Such keyless systems typically include a keypad located on the outer door panel and operatively connected to the door lock. Keypads on the door handle are also known, such as those disclosed in U.S. Pat. Nos. 7,911,321 and 6,854,870. However, there continues to be a need in the industry for an improved keyless power lock door handle, particularly in the agricultural industry, heavy duty equipment industry, heavy truck industry and off road vehicle industry.

Therefore, a primary objective of the present invention is the provision of a power locking exterior door handle with an integrated keypad for use in various industries.

A further objective of the present invention is the provision of a pull-type door handle having a keypad integrated into the pivotal handle, wherein the keypad can be coded for locking and unlocking the vehicle door.

Still another objective of the present invention is the provision of a power locking pull handle assembly for a door having a lock and a latch, with a keypad sandwiched between a handle cover and handle backbone so as to distribute forces across the cover, the backbone, and the key pad.

Another objective of the present invention is the provision of a pull handle assembly for a vehicle door, including a base, a pivotal handle, and a keypad incorporated into the handle to lock and unlock the door using a keypad code.

A further objective of the present invention is the provision of a power locking pull handle assembly for a vehicle door wherein a base supports the power lock assembly and a handle with a keypad.

Yet another objective of the present invention is the provision of a power locking pull handle assembly for a vehicle door wherein the handle assembly includes a light source and an audio source to provide feedback to a person using the handle.

Another objective of the present invention is the provision of a smart vehicle door handle having a built-in keypad to control and input data for various functions of the vehicle.

A further objective of the present invention is the provision of a door handle with an integrated keypad to support telematic functions.

Still another objective of the present invention is the provision of a door handle having multiple user interfaces, including radio frequency identification device (RFID), RF, biometrics, Bluetooth, NFC, and other methods of identification and communication.

These and other objectives of the invention will be apparent from the following description of the invention.

SUMMARY OF THE INVENTION

The present invention integrates a keypad into a door handle on machinery, equipment, heavy trucks, or other vehicles, such as in the agricultural and construction industries. The handle may be of various types, such as a pull handle or a push button handle. By integrating the keypad into the handle, a less visually intrusive solution is provided, as compared to a separate keypad, mounted adjacent to the handle.

High performance of the keypad handle is necessary for applications having high stress or forced loads placed on the handle during operation, including radial and linear forces applied to the handle. The handle strength is increased by sandwiching the re-enforced keypad between a handle cover and a backbone or back plate. Loads or forces on the handle are thereby shared or distributed across the handle cover, backbone, and keypad, to eliminate twisting of the handle during operation. The cover and backbone are interlocked together. The backbone has a standing wall to support the keypad. A screw or pin fastener at the back or rear of the cover and backbone is received in the base of the handle assembly so as to isolate side load from the retention screw.

The keypad extends through a cutout in the exterior surface of the handle cover to provide ergonomic operation and to minimize size of the handle. The keypad cover is compressed and includes wiper beads to create a line contact, and thereby seal the handle and keypad against water entry.

A control module, including motor drive circuitry, is integrated into the handle for power locking and unlocking of the door lock. The handle also offers network communication to the machine, equipment or vehicle. A keyed lock cylinder is provided on the handle as a secondary backup option to the keypad. The lock cylinder resides in a recess in the handle, and has a cap to minimize leakage of water and moisture. Emergency power contacts can be provided on the handle beneath the lock cylinder cap with a household battery, in the event that machine power fails.

The combination keypad handle minimizes visual obstructions or distractions for the operator, and is durable in harsh environments. The keypad handle operates the door lock and provides for multiplexing communication with other features and functions of the vehicle through a control area network (CAN), LIN, or other electronic communication system, so that telematic functions can be achieved. The keypad handle can also interface with the vehicle to obtain various functions, such as keyless ignition and immobilization, operator recognition through use of an identification unique to each person or user as recognized by a central processing unit (CPU), an audit trail, and control of other vehicle systems and features such as lighting, hydraulics, and the like. The keypad can also input operator recognition, such as an identification code, to allow or enable the telematics system to interface with and/or control vehicle function and vehicle health.

The keypad also may provide visual and/or audible feedback to an operator or other user based upon the buttons pressed and action taken. Backlighting for the keypad and/or an integrated night light in the handle provides improved night visibility. The footprint of the keypad power locking pull handle is the same as a power locking pull handle without a keypad so as to provide a consistent appearance, assembly process, and user experience. The handle housing may also incorporate LED lighting.

DETAILED DESCRIPTION OF THE PREFERRED EMBODIMENTS

Figure 13:
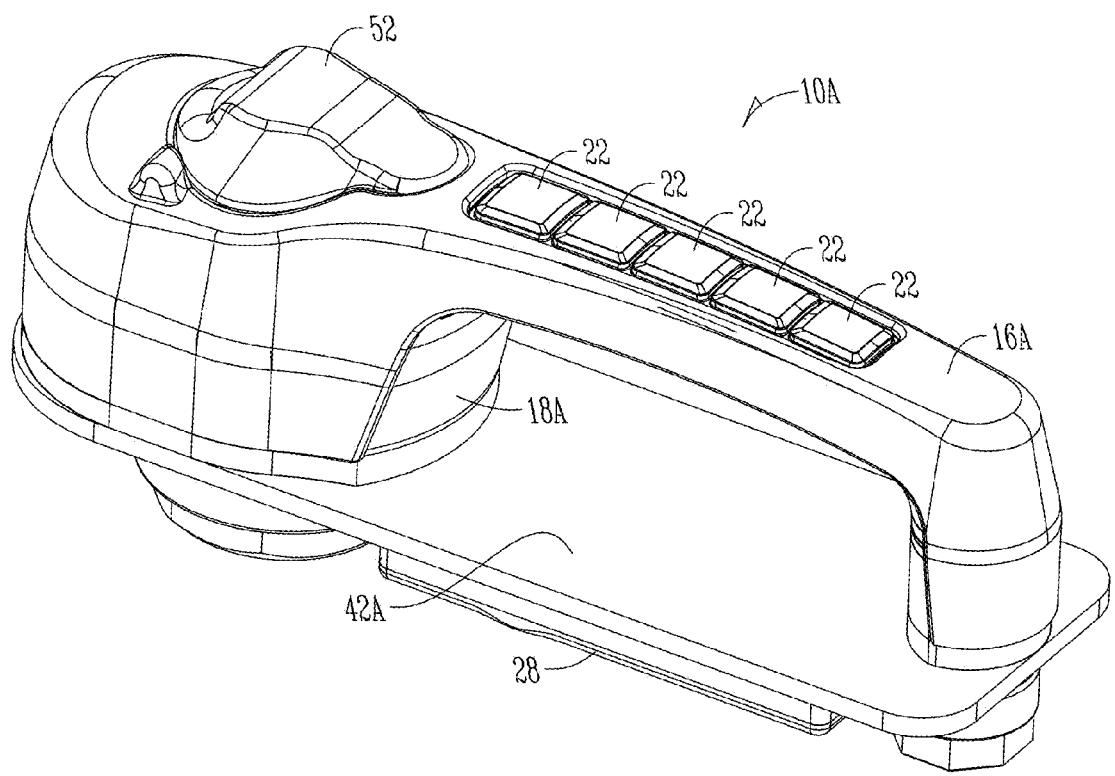
FIG. 13 is a perspective view of a push button type handle having the integrated keypad according to the present invention.
Figure 14:
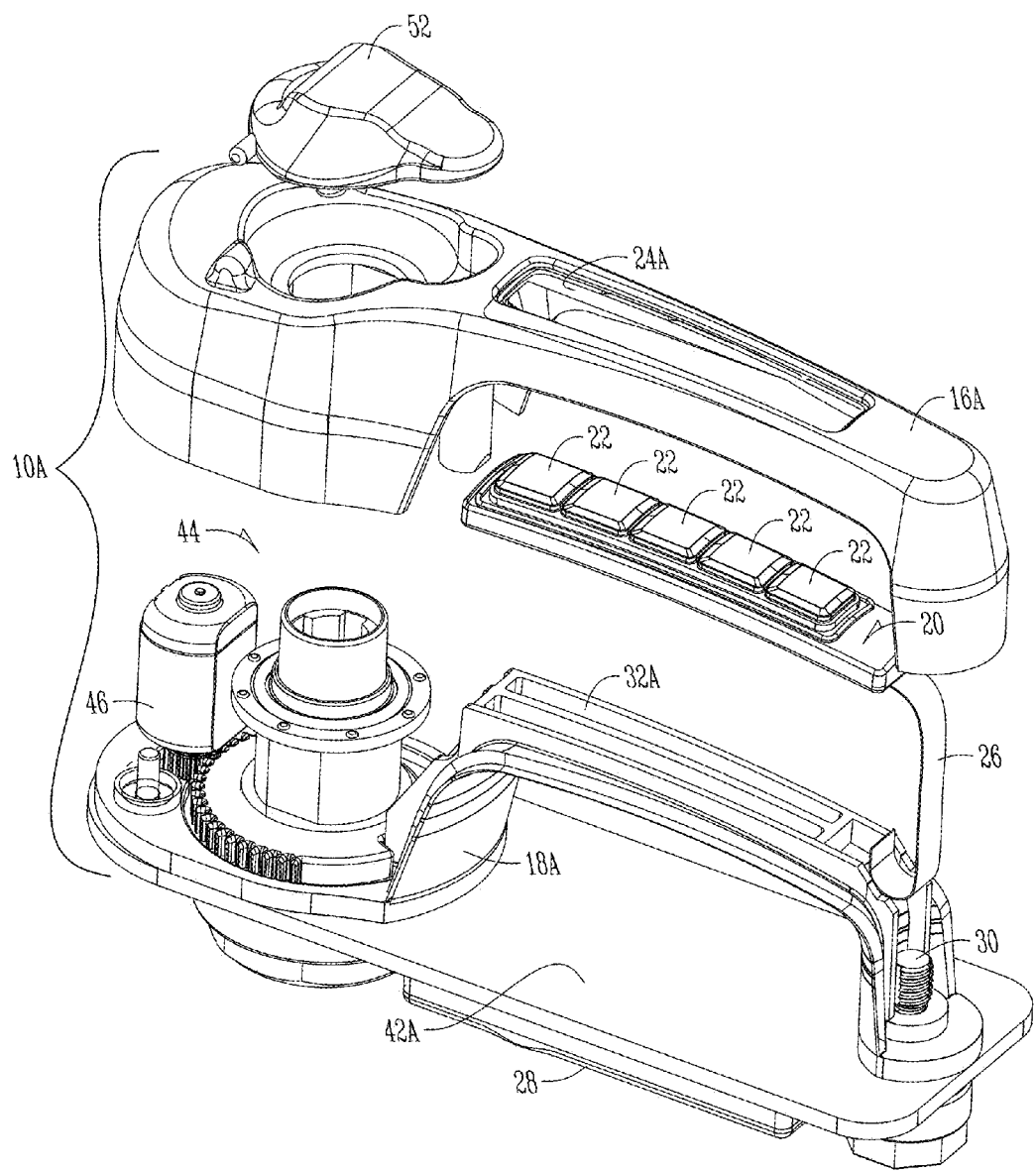
FIG. 14 is an exploded view of the push button handle shown in FIG. 13.
Figure 15:
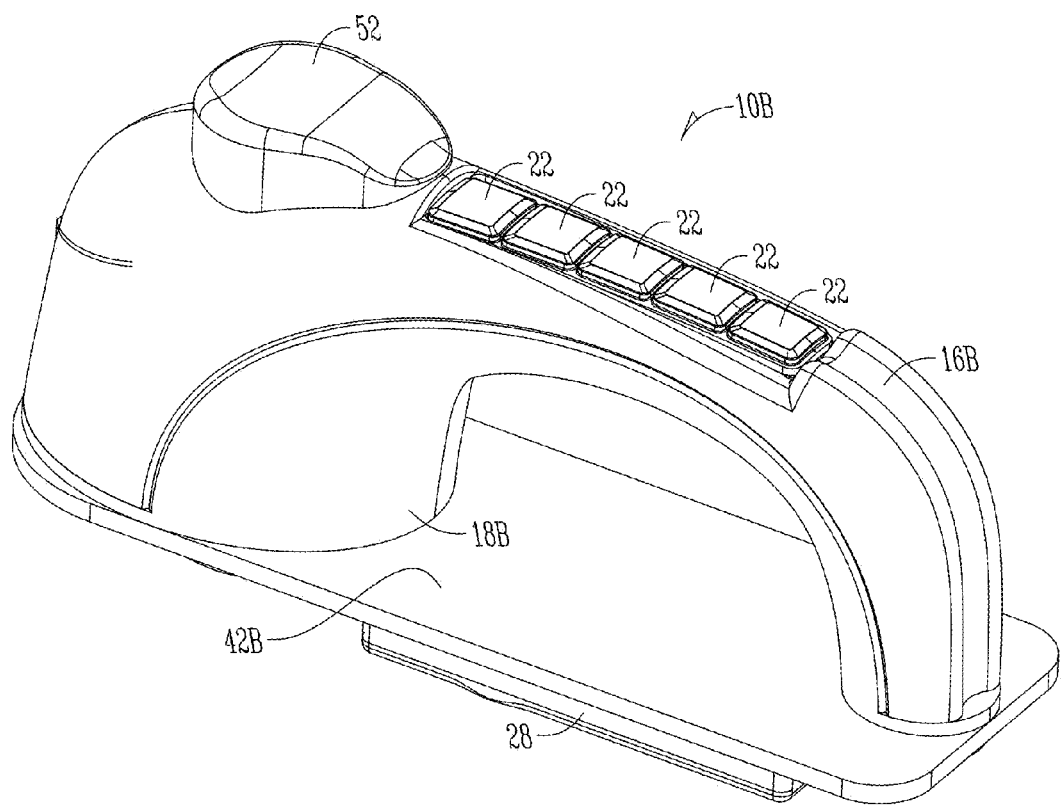
FIG. 15 is a perspective view of a second embodiment of a push button handle having an integrated keypad according to the present invention.
Figure 16:
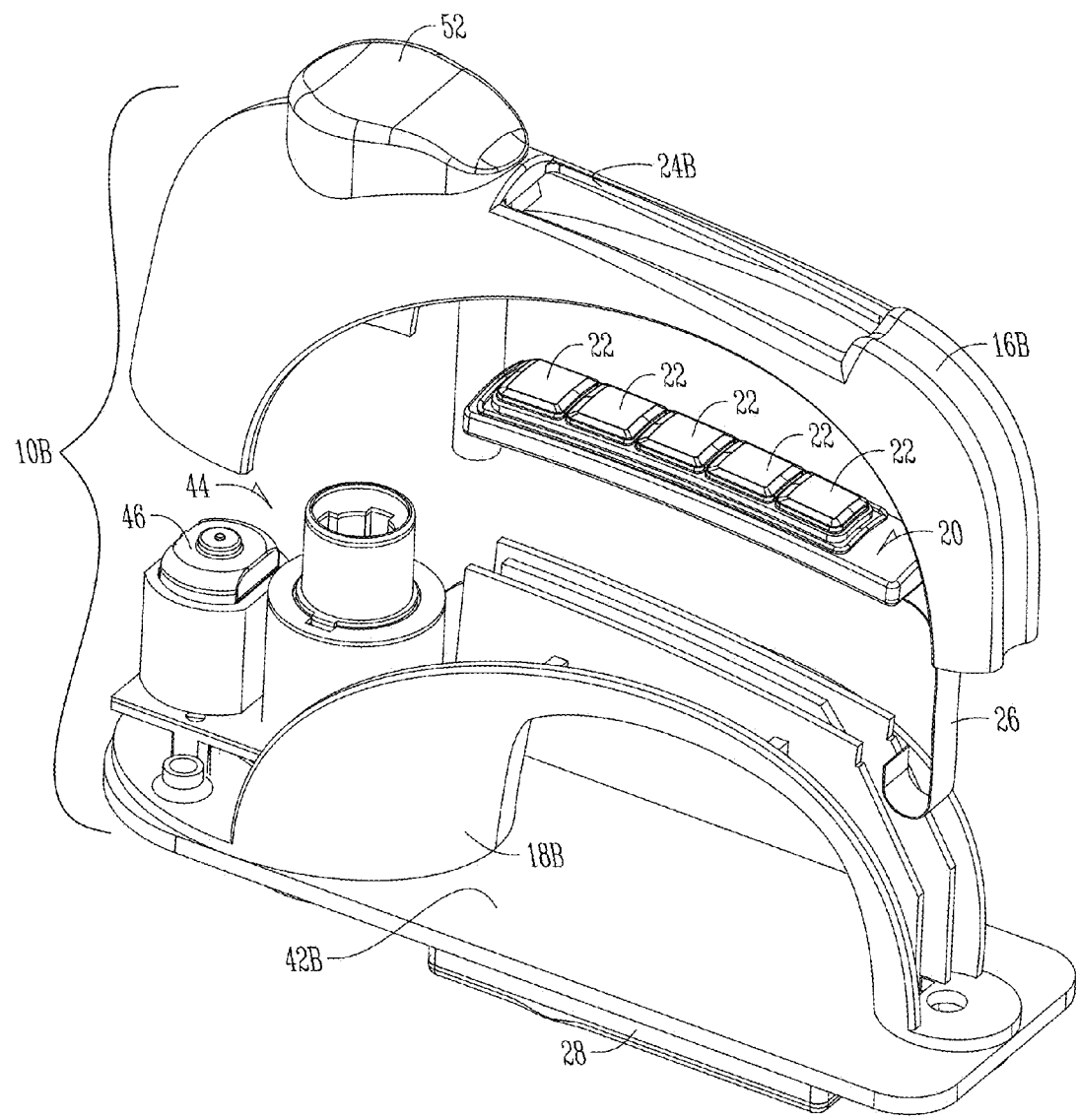
FIG. 16 is an exploded view of the push button handle shown in FIG. 15.

Handles of the present invention are intended to be mounted on the exterior surface of doors, particularly for agricultural and industrial or commercial machinery, equipment and vehicles, though use on other types of doors is also within the scope of the present invention. FIGS. 1-12 show a first embodiment of a handle assembly 10 according to the present invention. The handle assembly 10 is a pull-type handle. FIGS. 13 and 14 show a second embodiment handle assembly 10A, in the form of a push button handle. FIGS. 15 and 16 show a third embodiment of the handle assembly 10B in another form of a push button type handle.

A. Pull Handle

Figure 1:
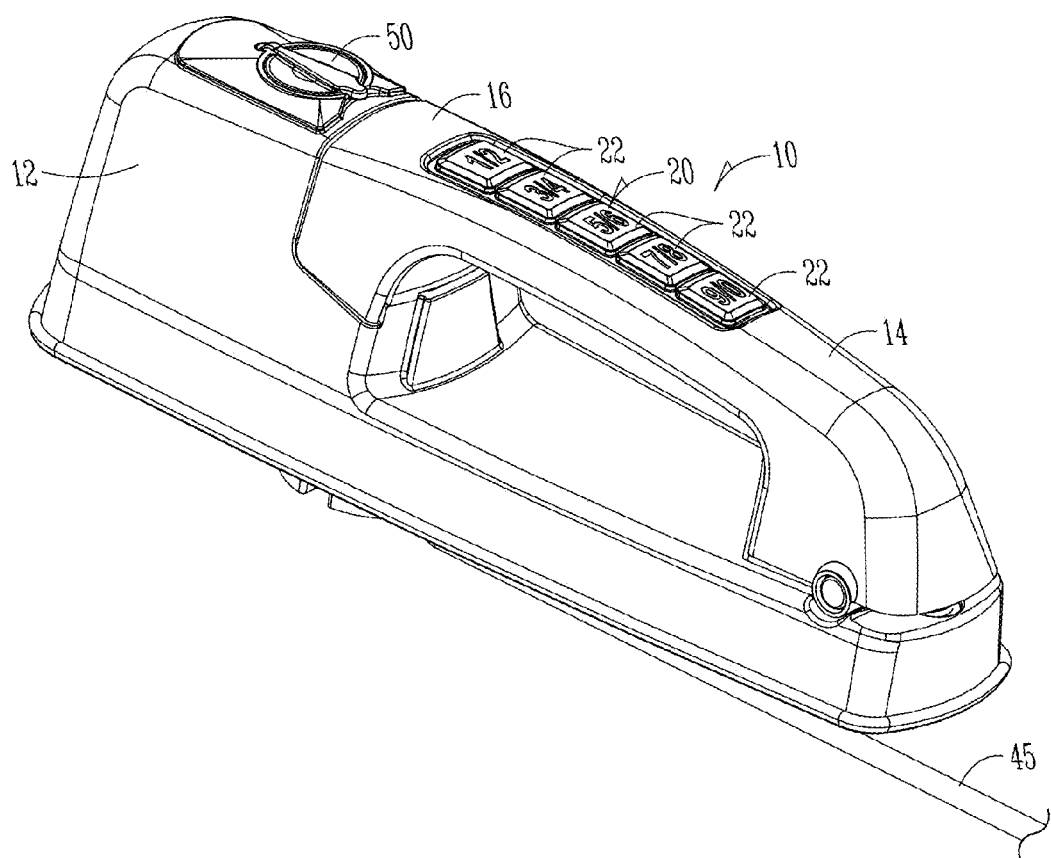
FIG. 1 is a perspective view of a power locking pull handle with integrated keypad in accordance with the present invention.
Figure 2:
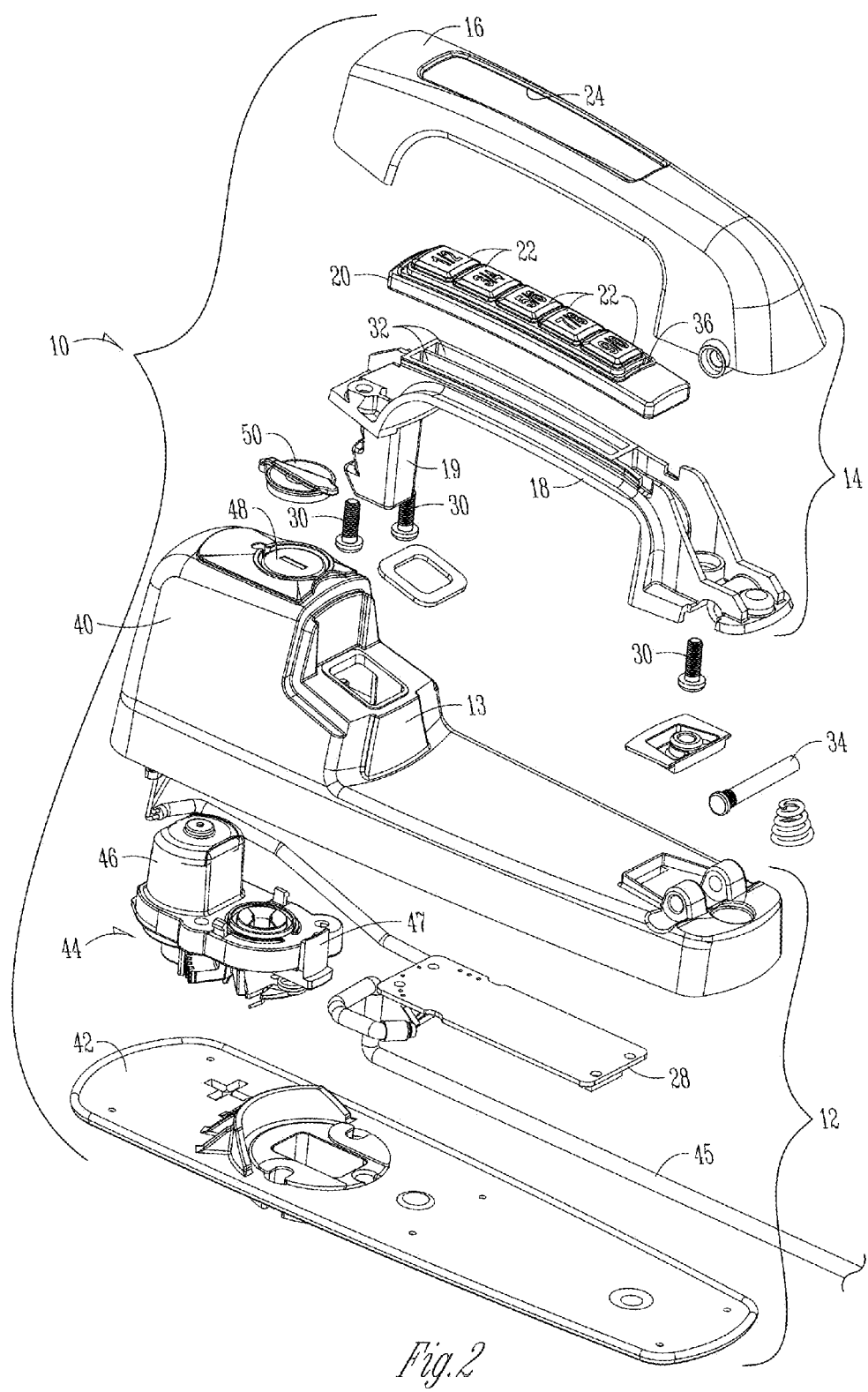
FIG. 2 is an exploded view of the primary components for the handle shown in FIG. 1.
Figure 3:
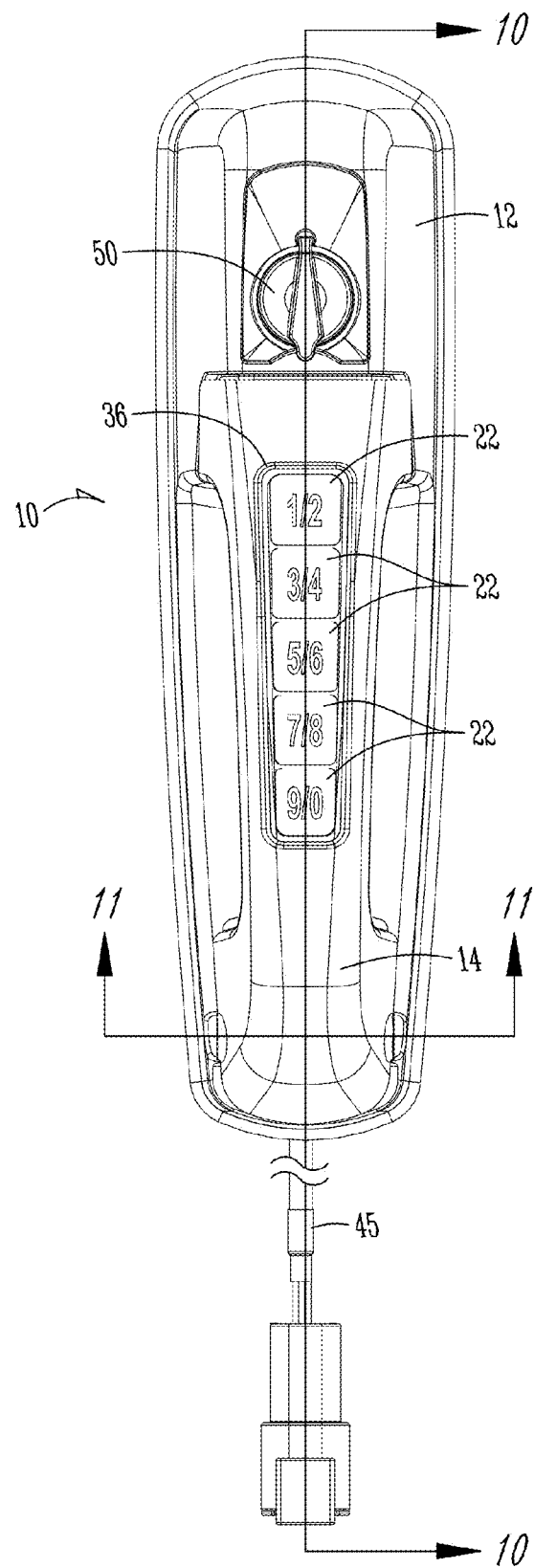
FIG. 3 is a top plan view of the handle shown in FIG. 1.
Figure 4:
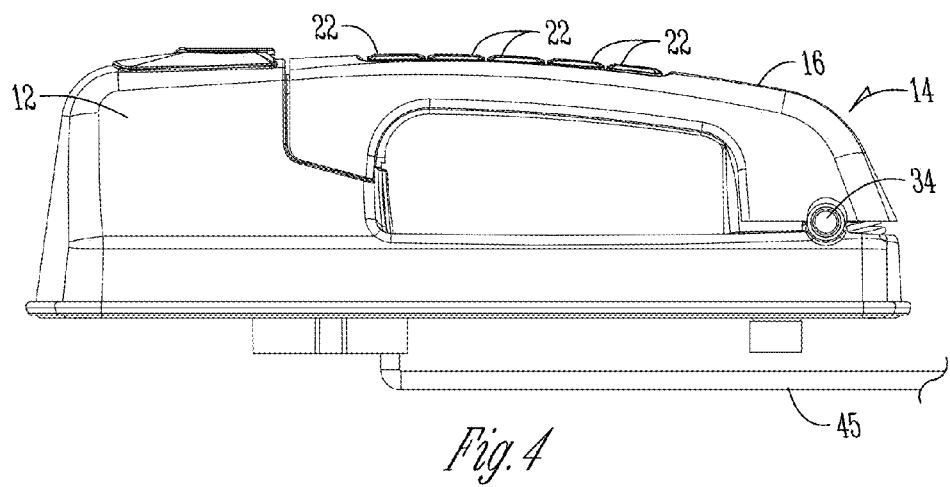
FIG. 4 is a side elevation view of the handle shown in FIG. 1.
Figure 5:
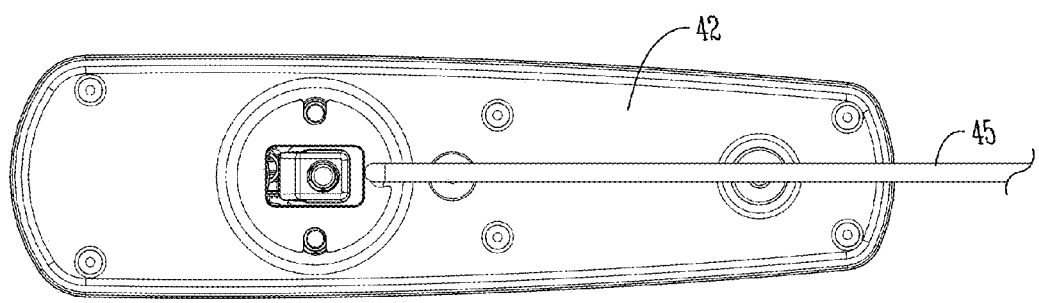
FIG. 5 is a bottom plan view of the handle shown in FIG. 1.
Figure 6:
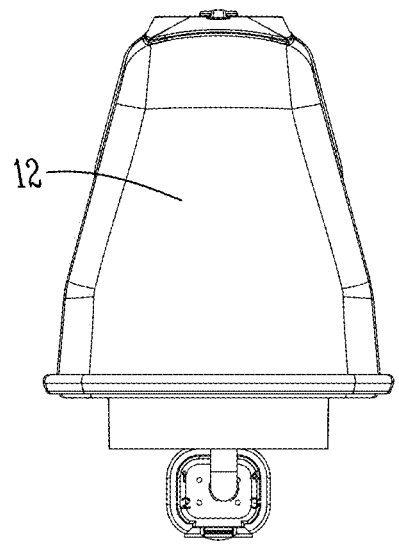
FIG. 6 is an elevation view from the left end of the handle shown in FIG. 1.
Figure 7:
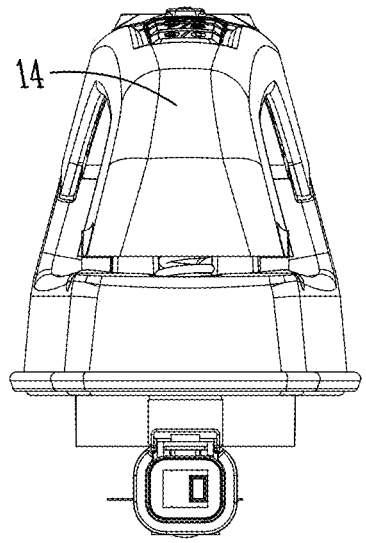
FIG. 7 is an elevation view from the right end of the handle shown in FIG. 1.
Figure 8:
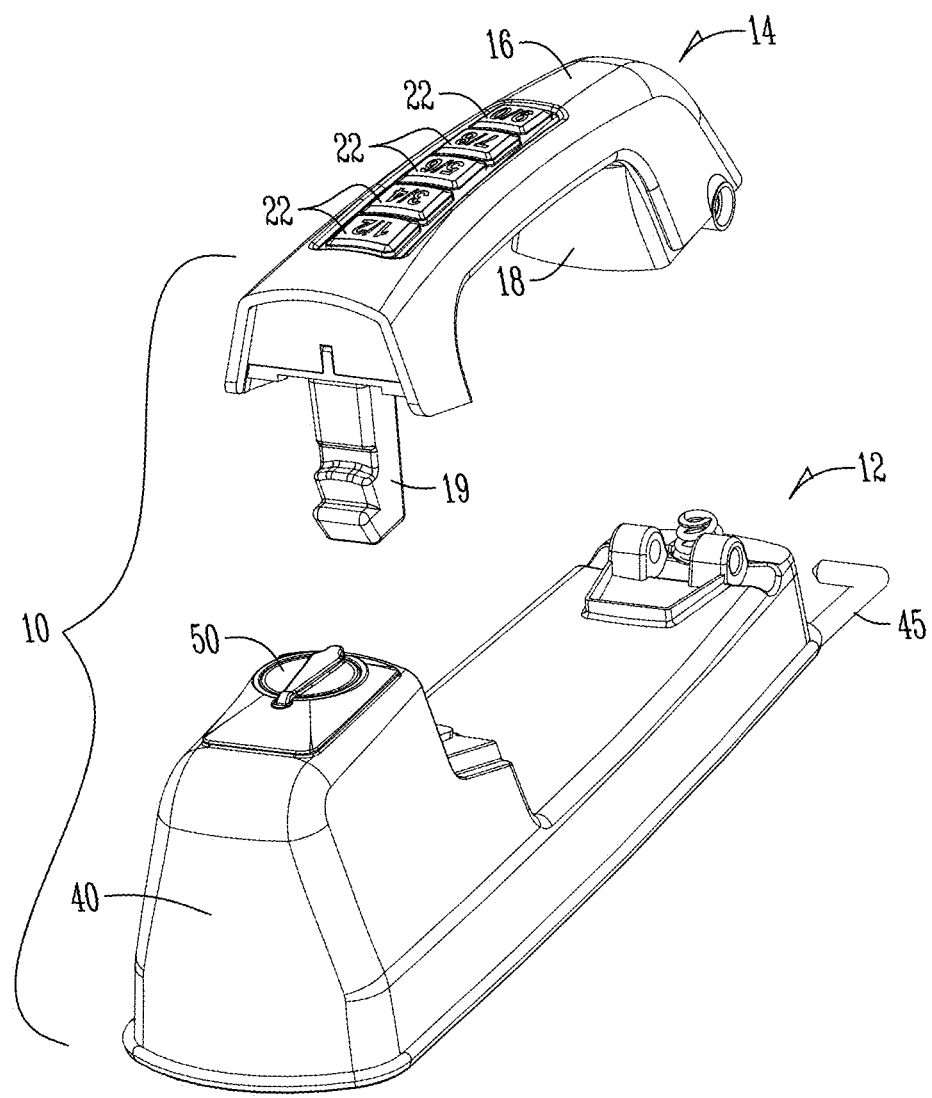
FIG. 8 is an exploded view of the handle and base of the handle assembly shown in FIG. 1.
Figure 9:
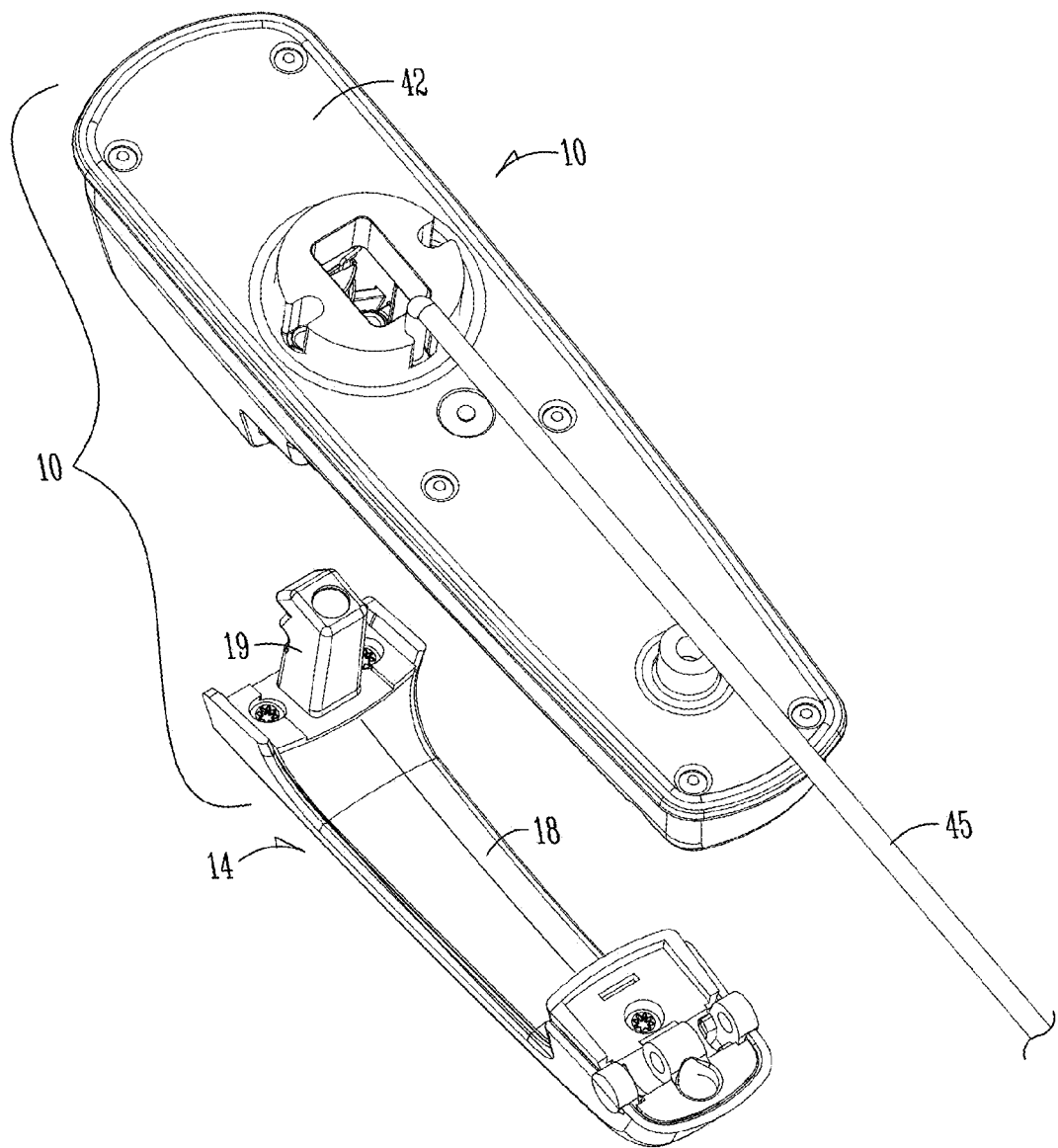
FIG. 9 is another partially exploded view of the handle assembly shown in FIG. 1.

The handle assembly 10 includes a base 12 with a pull handle 14. The pull handle 14 has a cover 16 and a backbone 18 which is secure together by screws. A keypad 20 includes a steel plate 21 that is sandwiched between the cover 16 and the backbone 18. The keypad 20 also includes switches 23 with up to 10 unique and support buttons 22 that are covered by a rubber or plastic membrane which extend through a cutout 24 of the cover 16, as best seen in FIG. 2. A flexible electric connector 26 extends through a slot in the backbone 18 and plugs into a connector on a printed circuit board (PCB) 28 to electrically couples the keypad switches in the keypad 20 to PCB. The keypad 20 sits on top of the walls 32, so as to be sandwiched between the backbone 18 and the cover 16, with the cover and backbone securement screws creating a compressed sealing engagement between the cover 16 and the backbone 18 along the perimeter edge of the rubber buttons 22, so as to provide a rigid and water resistant seal. The buttons 22 may also have a raised perimeter bead 36 residing adjacent the cutout 24 of the cover 16, thereby providing a moisture seal or barrier to preclude migration of moisture into the pull handle 14.

Figure 10:
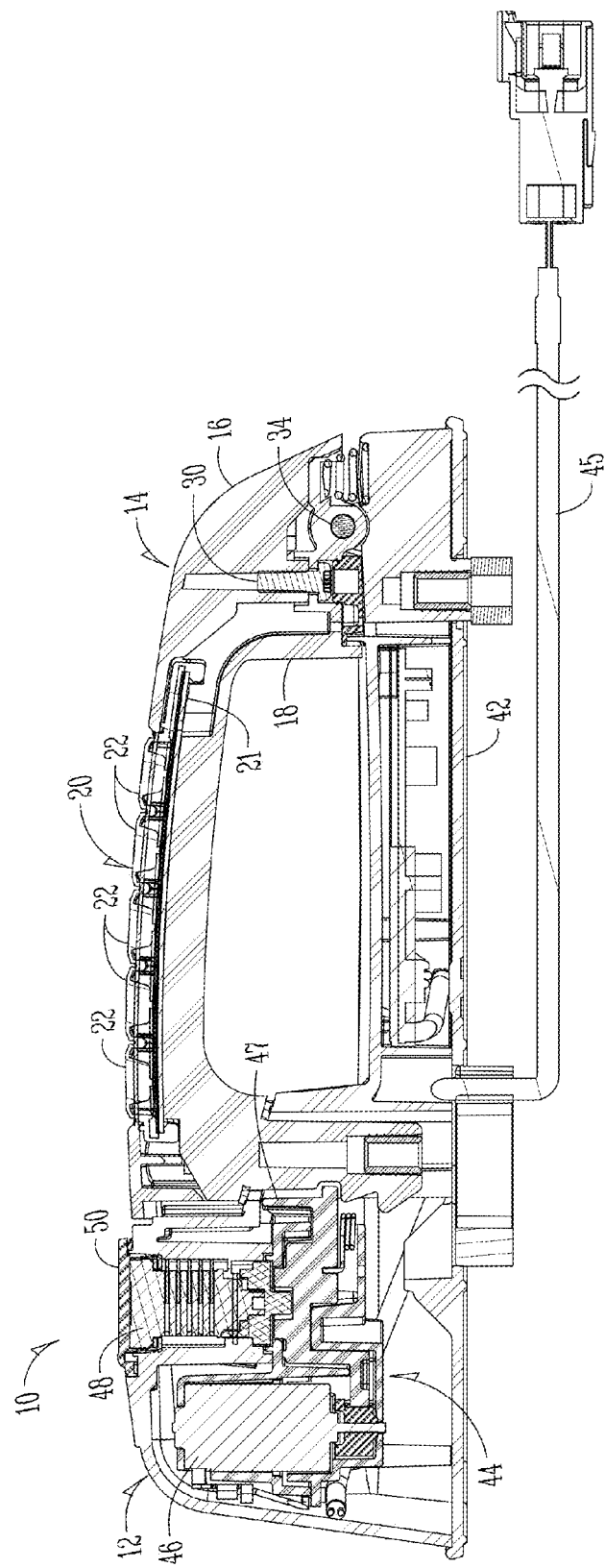
FIG. 10 is a sectional view taken along lines 10-10 of FIG. 3.
Figure 11:
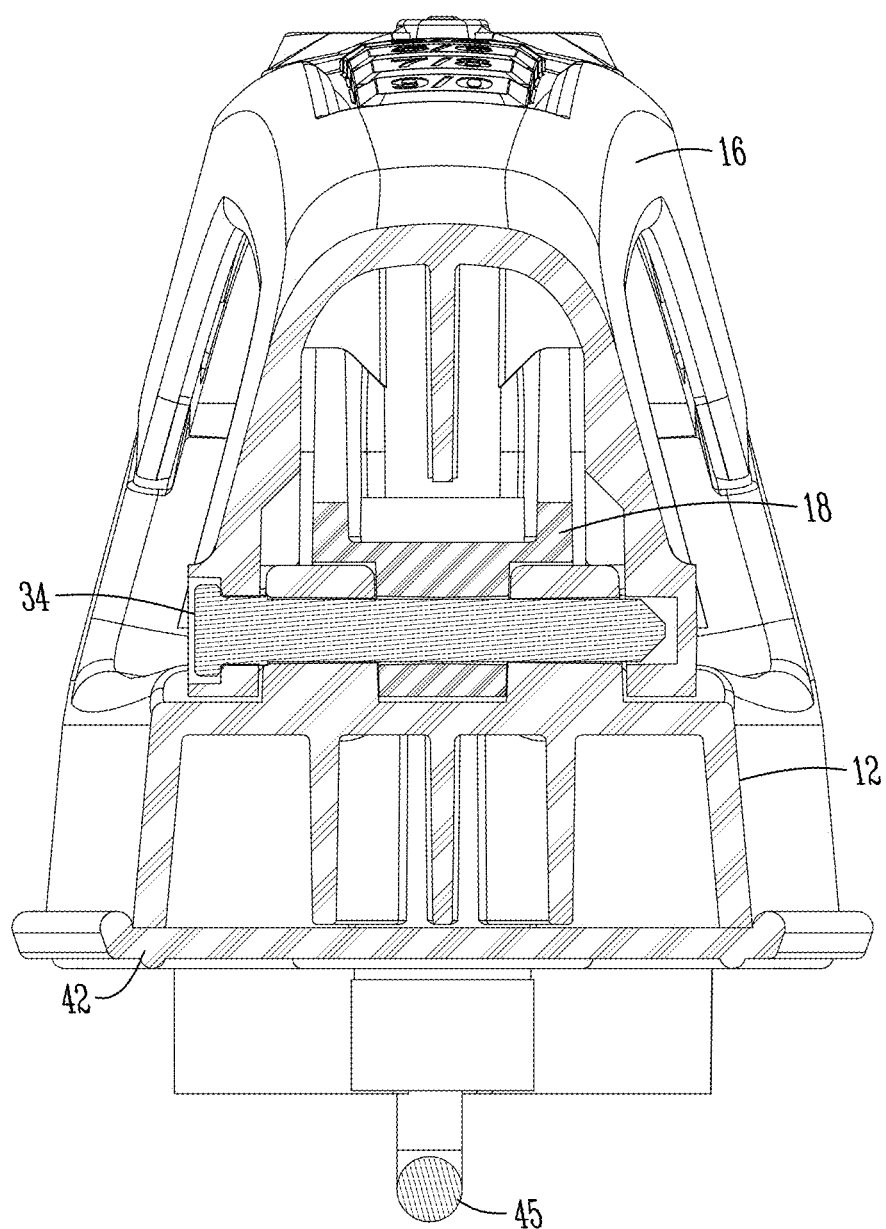
FIG. 11 is a sectional view taken along lines 11-11 of FIG. 3.
Figure 12:
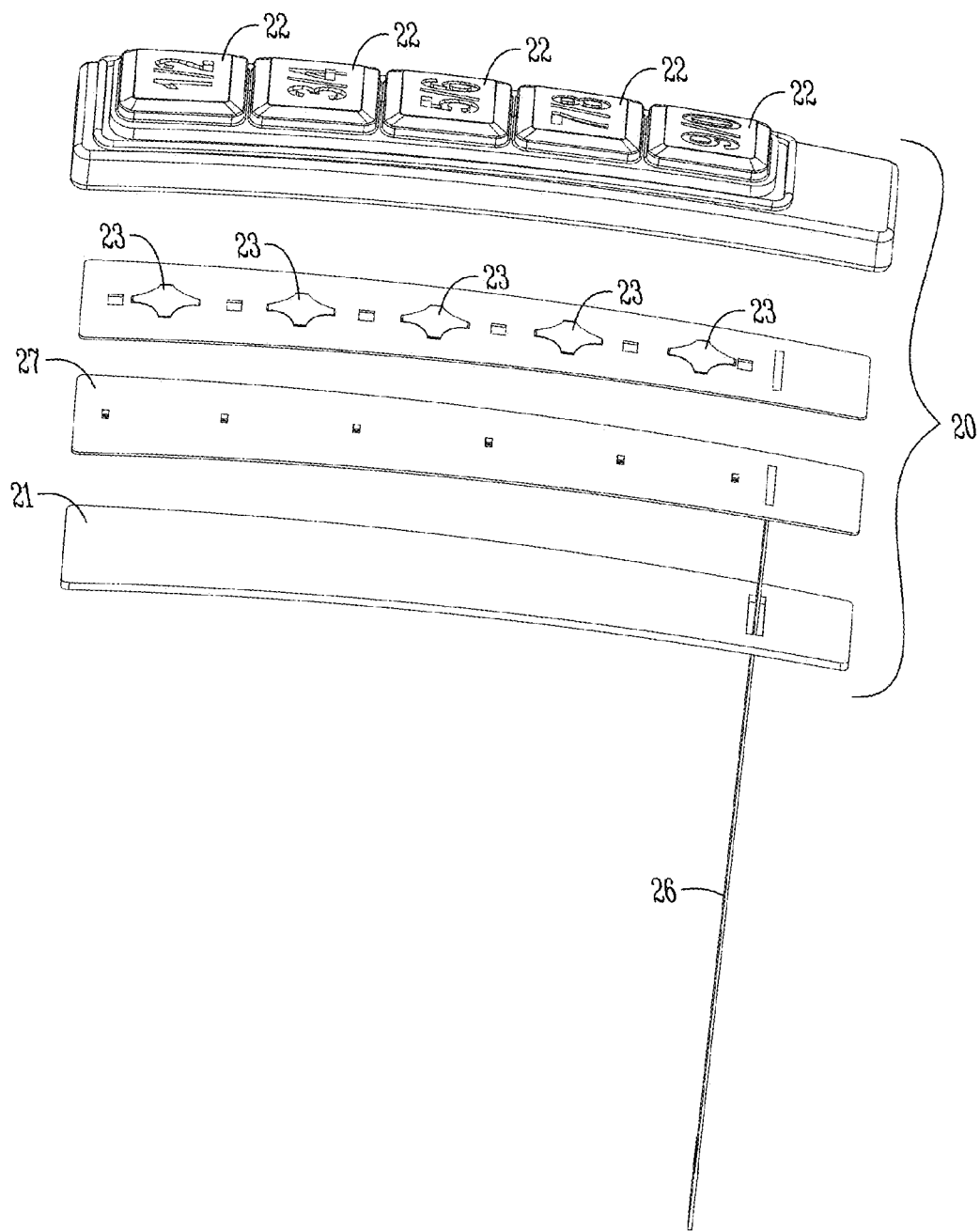
FIG. 12 is an exploded perspective view of the handle keypad according to the present invention.

FIG. 10 shows an example of one of the screw connections for the pull handle cover 16 and backbone 18, wherein the screw fastener 30 located adjacent the lower or pivot end of the pull handle 14 isolates side loads on the screw. Preferably, the backbone 16 is a curved piece with upstanding ribs or walls 32, shown in FIG. 2 which provides enhanced strength and rigidity to the pull handle 14. The assembled handle cover 16, backbone 18 and keypad 20 distributes the radial and linear forces on the pull handle 14 across these three components, such that the load is shared.

The pull handle 14 is mounted to the base 12 by a pin 34 which defines a pivot axis for the pull handle 14. The pin 34 extends laterally across the lower end of the base 12 and pull handle 14.

The base 12 of the handle assembly 10 includes a housing 40 and a base plate or gasket 42 which are coupled by screws or rivets. A power lock assembly 44 is mounted within the housing 40. The power lock assembly 44 includes an electric motor 46, which is operatively connected to a printed circuit board or control unit 28 and to a power source, such as a battery, for the machinery, equipment, or vehicle. The power lock assembly 44 is described in detail in Applicants' issued U.S. Pat. No. 7,819,440, which is incorporated herein by reference. A wire harness electrically connects to the PCB 45/control module 27 to the vehicle's communication network (LIN, CAN, or other network communication protocol) and power system. The wire harness has 4 or more wires which provide power, ground, network communication, and a wake-out signal to wake up the vehicle network when a keypad button 22 is pressed by a user.

A key cylinder 48 is also mounted in the base 12 and is operatively connected to the power lock assembly 44, as described in Applicants' U.S. Pat. No. 7,819,440. A cap 50 is mounted to the base housing 40 to cover the key cylinder 48 and thereby prevent migration of moisture and dust into the cylinder 48.

An LED light may be operatively mounted within the handle 14 to provide lighting or backlighting. For example, a lens 13 may be formed in the base 12 in covering relation to the LED. The lighting can also be functional by providing indicative feedback for improved intuitive use or for informative diagnostics. For example, the feedback can be a result of different colored lighting, different light intensities, or variable flashing lights.

The handle 10 may also include a speaker for audible feedback, similar to the lighting feedback.

The backbone 18 includes a leg 19 which extends through the base 12 and is operatively connected to the door latch. The lock assembly 44 includes a lock arm 47 movable between locked and unlocked positions. When in the locked position, the lock arm 47 blocks the leg 19 from movement when the handle 14 is pulled, so that the latch cannot be released. When the lock arm is in the unlocked position, the leg 19 is free to move when the handle 14 is pulled. Thus, the leg 19 releases the door latch when the pull handle 14 is pulled and pivoted about the pin 34, thereby releasing the door for opening after the door lock is unlocked.

B. Push Button Handle

The push button handle assembly 10A of FIGS. 13 and 14 includes a handle cover 16A and a backbone 18A mounted to a base plate 42A. The keypad 20 is sandwiched between the backbone walls 32A and the cover 16A, with the keypad buttons 22 extending through a cutout 24A in the cover 16A. The electrical connector 26 extends from the keypad switches to the PCB 28 in the keypad 20.

The handle assembly 10A also includes a power lock assembly 44 with an electric motor 46 and linkage to the door lock, similar to that described above and as described in Applicants' U.S. Pat. No. 7,819,440. A push button 52 on the handle cover 16A is operatively connected to the door latch so as to unlatch the door when the door is unlocked.

The push button handle assembly 10B of FIGS. 15 and 16 includes a handle cover 16B and a backbone 18B mounted to a base plate 42B. The keypad 20 is sandwiched between the backbone walls 32B and the cover 16B, with the keypad buttons 22 extending through a cutout 24B in the cover 16B. The electrical connector 26 extends from the keypad switches to the PCB 28 in the keypad 20. The PCB is potted so as to seal out the weather elements and to provide vibration resistance.

The handle assembly 10B also includes a power lock assembly 44 with an electric motor 46 and linkage to the door lock, similar to that described above and as described in Applicants' U.S. Pat. No. 7,819,440. A push button 52 on the handle cover 16B is operatively connected to the door latch so as to unlatch the door when the door is unlocked.

The push button handles 10A and 10B have similar structure to the pull handle 10, except that the PCB 28 is located within the door for the push button handles, thereby providing further resistance to the elements.

C. Electronic Functionality

Figure 17:
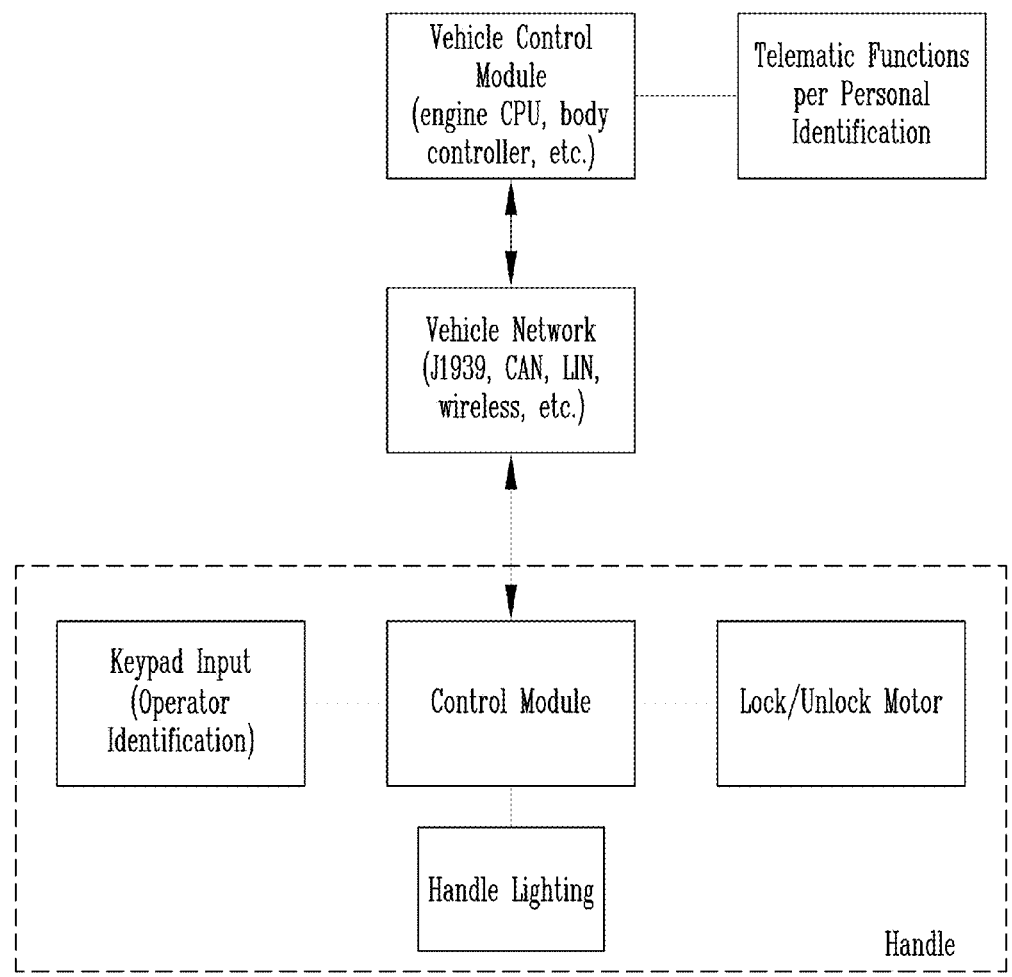
FIG. 17 is a block diagram of one embodiment for a basic keypad interface.
Figure 18:
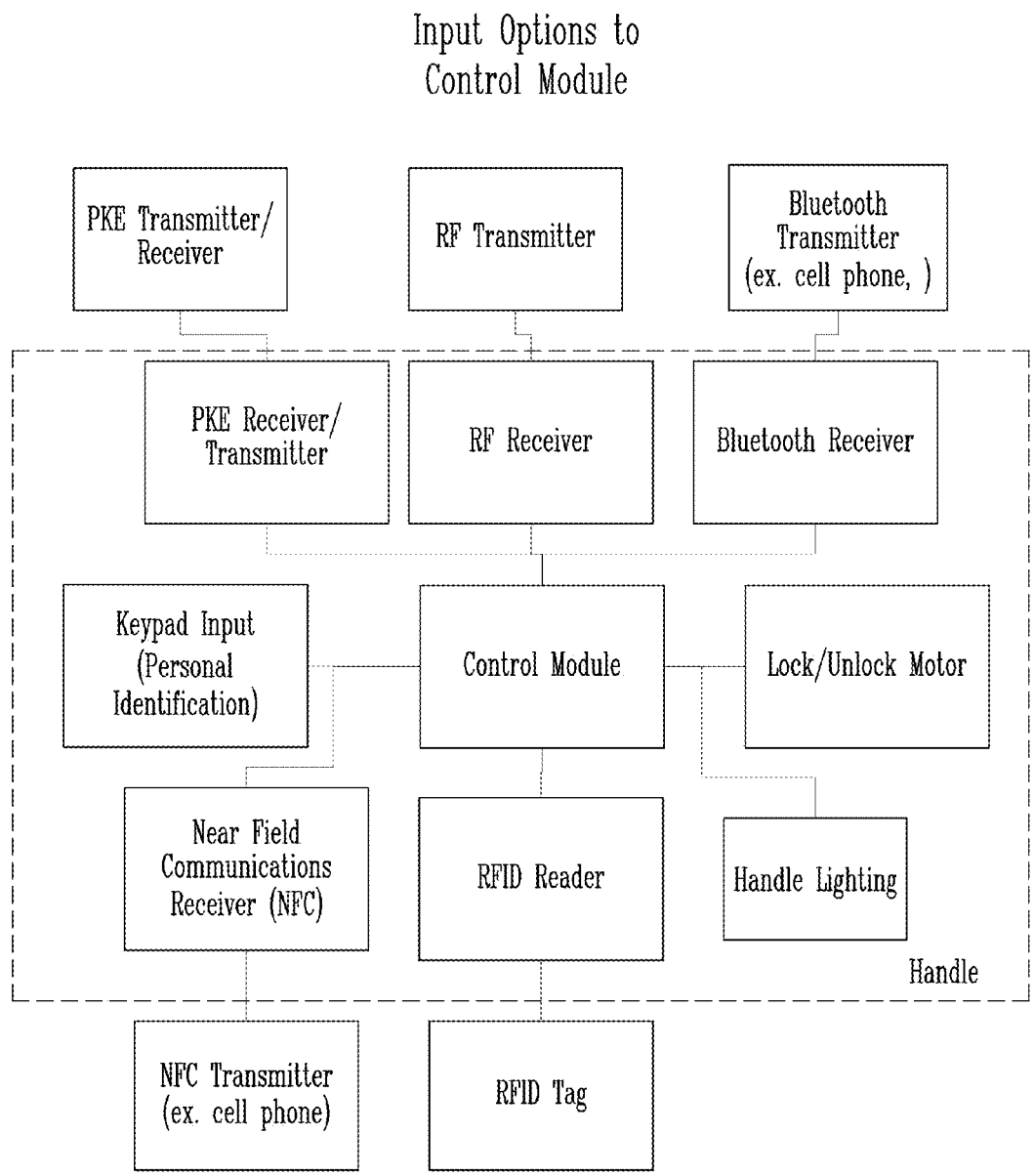
FIG. 18 is a block diagram of one embodiment of input options for the control module.

The PCB 28 provides various control functions for the handles 10, 10A and 10B. For example, the PCB 28 provides the ability to communicate through the keypad 20 with a computer or CPU located in the vehicle, at an office, or any other remote site. The communication can utilize different interfaces, such as RF, RFID, biometrics, Bluetooth, NFC, network communication, or other methods. As shown in FIG. 17, a control module can be housed within the handle, and be operatively connected to a vehicle control module and other telematic functions through a vehicle network, such as J1939, CAN, LIN or wireless. There can also be numerous input options for the handle control module, including but not limited to those shown in FIG. 18.

For example, the telematic functions may include:
Personal preferences (radio presets, climate, etc.)
Owner/fleet manager settings (such as rental agreements).
    Particular user function can be customized
        Control feature availability
        Control access timing
        Control access
        Use only at certain locations (i.e. geo graphic fence)
        Use only after certain conditions apply, such as:
            If rental payments is received
            If proper preventative maintenance (PM) activities have occurred
            If appropriate training has occurred
            If weather conditions are acceptable
Industry, insurance, legal concerns. Machine or vehicle usage can be linked to particular user, and as such, an audit trail may be useful.
Productivity of operator of a machine can be better assigned to user of the machine with required user identification.
Log book records can be accumulated automatically, resulting in easier and more accurate creation and distribution of such records.

Other communication modules and telematics features with increased functional results are possible when personal identification is assigned. Functions can be assigned and interlock can be established by the user.

It is understood the method to establish personal identification has 2 elements:
  Multiple personal identification technologies: Multiple user interfaces in additional to a keypad, as shown in FIG. 17. (keypad code, RFID, smart phone via Bluetooth or NFC, biometrics, etc.)
  Mounting location: Inherit to this integrated design is the provision to mount the keypad handle at an exterior location (typically the main entry door) or point of entry. By doing so, access control is linked with personal identification. This mounting provides several benefits:
    (1) Extra convenience, as compared to a system mounted to the dash of the vehicle or machine— by gaining access to the cab, one's identification is established and there is no need to perform additional activities to start the machine at the dash location.
    (2) An extra layer of security as the system can enable access to cab and enable other subsystems for typical operations (enabling ignition, etc.). If the handle is damaged in an effort to break open the door, then other functions such as ignition can remain disabled.
    (3) Access to other exterior functions
        Opening up other exterior compartments (engine or cargo areas, etc.)
            Engine access can enable further control of maintenance activities.
            Cargo areas such as heavy truck trailers have special needs for functionality related to cargo security.
        Enable other sub-systems (lighting, hydraulics, etc.)
        Allow exterior access point for diagnostic feedback (via indicator lighting, audio beeps, or other communications link wired, e.g. CAN or wireless, e.g. Bluetooth).
    (4) Personal identification can be established for other users who are not drivers, e.g. a mechanic could enter code to open an engine compartment but not have access to cab interior or fleet inspector to certify and document approved inspection.
    (5) A good location for other electronics for remote communication, e.g. RF, RFID, global positioning satellite (GPS) or Bluetooth. There are advantages to having such electronics located at exterior or peripheral locations. This provides a good access point for closer user interaction but also a location away from other shields or electronic "noise".

This provides convenient data communications for diagnostics (e.g. fleet inspector can activate lighting remotely while from outside of the vehicle and machine).

The keypad can also provide a wake up signal for other vehicle subsystems. By pressing a keypad button many electronic systems can be activated. This is particularly useful for keyless ignition systems. Pressing a keypad button may also turn on lighting associated with the handle, but also other lighting of the vehicle, and activate the GPS communication. This wake up feature minimizes connection time and battery usage.

The handles 10, 10A, and 10B with integrated keypads may also provide configurable immobilization features outputs. For example, the handle may incorporate a control module to provide for immobilization of a vehicle. The control module may include an intelligent control disposed within a housing of the control module, a plurality of discrete inputs and a plurality of discrete outputs operatively connected to the intelligent control, at least one network interface operatively connected to the intelligent control, at least one user interface operatively connected to the intelligent control, and software stored for execution by the intelligent control. The software provides the logic to control functions of a vehicle associated with the control module, the functions including vehicle immobilization functions, as more fully described in Applicants' co-pending patent application, 2012/0280805, incorporated herein by reference.

Integral to the uniqueness of this invention is it's mounting to the exterior surface of a vehicle or machine door. This provides essential access point for entry but also an access point for convenient diagnostics.

Installations of this invention are expected on vehicles and machines that are managed by fleets and have often scheduled periodic inspection and maintenance activities.

This invention provides for multiple user interfaces. Some, such as a keypad, are used close to installation, while others are remote, such as blue tooth or other wireless technology. These remote user interfaces provides much convenience for the inspection and maintenance user. This user would be able to perform inspections of the vehicle while being outside the vehicle. A simple example would be controlling and determining proper operation or malfunction of lights from outside the vehicle. Since the invention is linked to the vehicle communications network, much more complex inspections can result from outside of the vehicle or machine.

The nature of the exterior mounting and multiple user interfaces results in increased functionality that is unique to any prior art products.

What is claimed is:

1. An exterior power locking handle assembly for a door, the assembly comprising:
   a base;
   a handle pivotally mounted on the base;
   a power lock assembly mounted in the base to lock the handle against pivotal movement;
   a keypad on the handle and operatively connected to the power lock assembly for keyless unlocking of the door;
   the handle including a cover and a backbone interlocked together with at least one fastener to provide structural stability in the handle from both the cover and the backbone;
   the keypad being compressed and sealed between the cover and the backbone; and
   the base, handle, power lock assembly and keypad being coupled for mounting on an exterior surface of the door.

2. The handle assembly of claim 1 wherein the handle is a pull-type handle having a first end pivotally mounted to the base and having a second end operatively connected to the door latch.

3. The handle assembly of claim 1 wherein the handle is a push button type handle fixed on the base and having a push button operatively connected to the door latch.

4. The handle assembly of claim 1 wherein the fastener extends through the backbone and into the cover to isolate loads.

5. The handle assembly of claim 1 wherein the handle does not extend beyond the base.

6. The handle assembly of claim 1 wherein the cover includes a cutout and the keypad extends through the cutout.

7. The handle assembly of claim 1 wherein the power lock assembly includes a motor and drive circuitry for locking and unlocking the handle.

8. The handle assembly of claim 1 further comprising network communication within the handle.

9. The handle assembly of claim 1 wherein the handle further comprises a keyed lock cylinder.

10. The handle assembly of claim 1 wherein the handle further comprises a battery.

11. The handle assembly of claim 1 wherein the handle includes a light source.

12. The handle assembly of claim 1 wherein the handle includes an audio source.

13. The handle assembly of claim 1 wherein the keypad includes switches and a printed circuit board, with a rigid plate residing behind the switches and printed circuit board.

14. The handle assembly of claim 1 wherein the keypad includes switches and buttons covering the switches.

15. The handle assembly of claim 14 further comprising a printed circuit board with an electrical connector connecting the printed circuit board to the keypad.

16. The handle assembly of claim 1 wherein the keypad includes a resilient member sandwiched between the cover and the backbone to provide a water resistant seal.

17. The handle assembly of claim 1 wherein the keypad has a moisture seal to inhibit moisture migration into the handle.

18. The handle assembly of claim 1 wherein the backbone includes a leg operatively connected to the door latch.

19. The handle assembly of claim 1 wherein the keypad is programmable to enter unique personal identification for predetermined functions.

20. The handle assembly of claim 1 wherein a motor with control drive circuitry; a programmable microcontroller adapted to be customized for various configurations, applications and features; a platform for multiple user interfaces that enable user identification;
   and communication means to support telematics functions.

21. An exterior handle assembly for a vehicle door, comprising:
   a base with a housing mounted on an outside surface of the door;
   a handle mounted to the base and linked to a latch on the door;
   a motor mounted within the housing and being linked to a lock on the door;
   a structurally reinforced keypad on the handle and operatively connected to the motor to actuate the motor to unlock the door from outside the vehicle; and
   the handle having a backbone and a cover;

the keypad having a plate, switches, buttons, and a control board sandwiched between the backbone and cover; and the cover and backbone being secured together with at least one screw to distribute loads across the cover, backbone and keypad plate.

22. The exterior handle assembly of claim 21 wherein the handle is a pull-type handle having a first end pivotally mounted to the base and having a second end operatively connected to the door latch.

23. The exterior handle assembly of claim 21 wherein the handle is a push button type handle fixed on the base and having a push button operatively connected to the door latch.

24. The exterior handle assembly of claim 21 wherein the keypad plate is behind the control board, switches and buttons.

* * * * *